(12) United States Patent
Li et al.

(10) Patent No.: US 12,438,750 B2
(45) Date of Patent: Oct. 7, 2025

(54) CHANNEL INFORMATION PROCESSING METHOD AND APPARATUS

(71) Applicant: VIVO MOBILE COMMUNICATION CO., LTD., Guangdong (CN)

(72) Inventors: Jianjun Li, Guangdong (CN); Yang Song, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 501 days.

(21) Appl. No.: 17/994,681

(22) Filed: Nov. 28, 2022

(65) Prior Publication Data

US 2023/0085924 A1    Mar. 23, 2023

Related U.S. Application Data

(63) Continuation of application No. PCT/CN2021/095478, filed on May 24, 2021.

(30) Foreign Application Priority Data

May 28, 2020    (CN) .................. 202010470360.3

(51) Int. Cl.
*H04L 25/02*    (2006.01)
(52) U.S. Cl.
CPC ................ *H04L 25/0204* (2013.01)
(58) Field of Classification Search
None
See application file for complete search history.

(56) References Cited

U.S. PATENT DOCUMENTS

| 2007/0254601 | A1  | 11/2007 | Li |
| 2010/0034167 | A1* | 2/2010  | Umesh ............. H04L 1/1685 370/469 |

(Continued)

FOREIGN PATENT DOCUMENTS

| CN | 107465636 A | * 12/2017 | ........... H04B 7/0413 |
| CN | 111181671 A | 5/2020 | |
| JP | 2008079280 A | 4/2008 | |
| JP | 2013048441 A | 3/2013 | |
| JP | 2016105526 A | 6/2016 | |

OTHER PUBLICATIONS

First Office Action for Japanese Application No. 2022-572773, dated Jan. 10, 2024, 3 Pages.

(Continued)

*Primary Examiner* — Christopher T Wyllie
(74) *Attorney, Agent, or Firm* — BROOKS KUSHMAN P.C.

(57) ABSTRACT

A channel information processing method and apparatus. The method includes: receiving first information and second information from a terminal, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation; and determining channel information of a downlink channel based on the first information, the second information, and the second parameter.

20 Claims, 5 Drawing Sheets

(56) References Cited

U.S. PATENT DOCUMENTS

| | | | |
|---|---|---|---|
| 2012/0047407 A1* | 2/2012 | Tilwani | H04L 1/1841 |
| | | | 714/E11.067 |
| 2012/0139776 A1* | 6/2012 | Malmqvist | H01Q 1/521 |
| | | | 342/174 |
| 2016/0182135 A1* | 6/2016 | Onodera | H04B 7/0456 |
| | | | 375/267 |
| 2016/0234063 A1 | 8/2016 | Marsch et al. | |
| 2018/0323846 A1 | 11/2018 | Tsai et al. | |
| 2019/0115958 A1* | 4/2019 | Liang | H04L 5/14 |
| 2019/0238278 A1* | 8/2019 | Dudda | H04L 1/1896 |
| 2021/0013954 A1* | 1/2021 | Zhao | H04L 5/0023 |
| 2023/0085924 A1* | 3/2023 | Li | H04L 25/0204 |
| | | | 370/252 |
| 2023/0098904 A1* | 3/2023 | Hindy | H04L 5/0051 |
| | | | 370/329 |

OTHER PUBLICATIONS

Extended European Search Report for Application No. 21812614.2, dated Oct. 24, 2023, 13 Pages.

Huawei, "Partial reciprocity based CSI acquisition mechanism" 3GPP TSG RAN WG1 Meeting #90, Prague, Czech Republic, Aug. 2017, RI-1714338, 6 Pages.

ZTE "Preliminary views on further enhancement for NR MIMO" 3GPP TSG RAN WG1 Meeting #101-e, e-Meeting, May 2020, R1-2003483, 18 Pages.

First Office Action for Indian Application No. 202227073001, dated Oct. 20, 2023, 6 Pages.

\* cited by examiner

CHANNEL INFORMATION PROCESSING METHOD AND APPARATUS

CROSS-REFERENCE TO RELATED APPLICATIONS

This application is a continuation of International Application No. PCT/CN2021/095478 filed on May 24, 2021, which claims priority to Chinese Patent Application No. 202010470360.3, filed on May 28, 2020, which are incorporated herein by reference in their entireties.

TECHNICAL FIELD

This application belongs to the communication field, and specifically, relates to a channel information processing method and apparatus.

BACKGROUND

A massive antenna array formed by using a massive MIMO (Multiple-In Multiple-Out) technology can support more users in simultaneously transmitting and receiving signals, to increase a channel capacity and data traffic of a mobile network by dozens of times or more, while significantly alleviating interference between a plurality of users.

However, in a massive MIMO system based on FDD (Frequency Division Duplexing), a transmit end needs to obtain channel information to complete precoding work. In this case, a receive end needs to feed back the channel information. With a sharp increase in a quantity of antennas, an amount of channel information fed back also increases by order of magnitude correspondingly. When OFDM (Orthogonal Frequency Division Multiplexing) is combined with massive MIMO, channels on different frequency sub-bands are different due to frequency selectivity. Therefore, channel information feedback for a huge number of antennas needs to be performed simultaneously on a plurality of frequency sub-bands. It can be learned that, in a massive MIMO system, there are a huge number of antennas, and therefore large pilot overheads and feedback overheads are required for channel estimation and feedback.

SUMMARY

An objective of the embodiments of this application is to provide a channel information processing method and apparatus.

According to a first aspect, a channel information processing method is provided, applied to a network-side device, and including: receiving first information and second information from a terminal, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation; and determining channel information of a downlink channel based on the first information, the second information, and the second parameter.

According to a second aspect, a channel information processing apparatus is provided, including: a first receiving module, configured to receive first information and second information from a terminal, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation; and a first determining module, configured to determine channel information of a downlink channel based on the first information, the second information, and the second parameter.

According to a third aspect, a channel information processing method is provided, applied to a terminal, and including: transmitting first information and second information to a network-side device, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation.

According to a fourth aspect, a channel information processing apparatus is provided, including: a second transmitting module, configured to transmit first information and second information to a network-side device, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation.

According to a fifth aspect, a network-side device is provided, where the network-side device includes a processor, a memory, and a program or instructions stored in the memory and capable of running on the processor, and when the program or instructions are executed by the processor, the steps of the method according to the third aspect are implemented.

According to a sixth aspect, a terminal is provided, where the terminal includes a processor, a memory, and a program or instructions stored in the memory and capable of running on the processor, and when the program or instructions are executed by the processor, the steps of the method according to the third aspect are implemented.

According to a seventh aspect, a readable storage medium is provided, where the readable storage medium stores a program or instructions, and when the program or instructions are executed by a processor, the steps of the method according to the first aspect are implemented, or the steps of the method according to the third aspect are implemented.

According to an eighth aspect, a chip is provided, where the chip includes a processor and a communication interface, the communication interface is coupled to the processor, and the processor is configured to run a program or instructions for a network-side device, to implement the method according to the first aspect, or implement the method according to the third aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other examples obtained by a person of ordinary skill in the art based on the examples of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein. In addition, in the specification and claims, "and/or" represents presence of at least one of connected objects, and the symbol "/" in this specification usually indicates an "or" relationship between associated objects.

It should be noted that technologies described in the embodiments of this application are not limited to a long term evolution (LTE) or LTE-Advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described may be used in the aforementioned systems and radio technologies, and can also be used in other systems and radio technologies. However, in the following descriptions, a new radio (NR) system is described for an illustration purpose, and NR terms are used in most of the following descriptions, although these technologies may also be applied to other applications than an NR system application, for example, the sixth (6th Generation, 6G) communication system.

Figure 1:
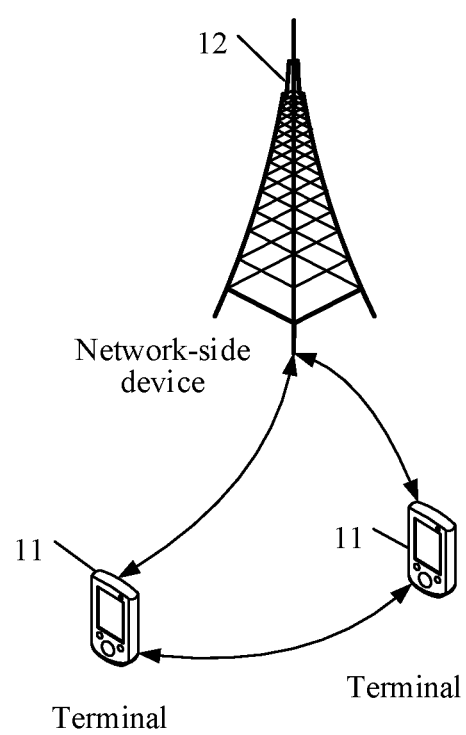
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network-side device 12. The terminal 11 may also be referred to as a terminal device or user equipment (UE). The terminal 11 may be a terminal-side device such as a mobile phone, a tablet computer (Tablet Personal Computer), a laptop computer or referred to as a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a band, a headset, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that the base station in the NR system is only used as an example in the embodiments of this application, but a specific type of the base station is not limited.

The following describes in detail a channel information processing method provided in the embodiments of this application by using specific embodiments and application scenarios thereof with reference to the accompanying drawings.

First, it should be noted that a specific process of interaction between a network-side device and a terminal involved in the channel information processing method in the embodiments of this application is as follows.

Step S102: The network-side device transmits a second parameter to the terminal, where the second parameter is determined based on uplink channel estimation and has uplink/downlink channel reciprocity.

Step S104: The terminal transmits first information and second information to the network-side device, where the first information includes a first parameter without uplink/downlink channel reciprocity, the first parameter is determined based on downlink channel estimation, the second information is used to indicate a deviation between the second parameter and a third parameter that have uplink/downlink channel reciprocity, and the third parameter is determined based on downlink channel estimation and has uplink/downlink channel reciprocity.

Step S106: The network-side device receives the first information and the second information from the terminal.

Step S108: The network-side device determines channel information of a downlink channel based on the first information, the second information, and the second parameter.

It can be learned that, in this embodiment of this application, the terminal needs to feed back only channel information without uplink/downlink channel reciprocity and a deviation between parameters with reciprocity to the network-side device, and the network-side device determines the channel information of the downlink channel based on this part of information and information that has uplink/downlink channel reciprocity and that is determined based on uplink channel estimation, thereby greatly reducing pilot and feedback overheads of downlink channel estimation. In this way, the following problem in the conventional technology is resolved: In a massive MIMO system, large pilot overheads and feedback overheads are required for channel estimation and feedback due to a huge number of antennas.

The following describes the channel information processing method in the embodiments of this application separately from the perspectives of the network-side device and the terminal.

Figure 2:
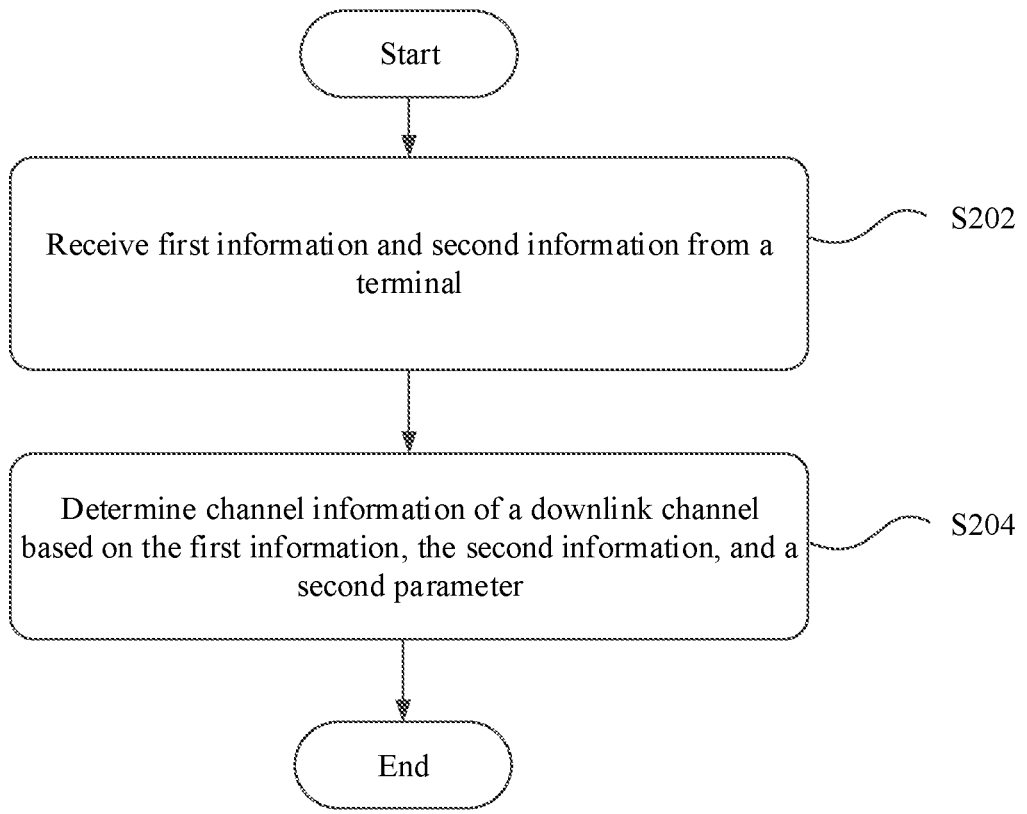
FIG. 2 is a flowchart 1 of a channel information processing method according to an embodiment of this application.

FIG. 2 is a flowchart 1 of a channel information processing method according to an embodiment of this application. As shown in FIG. 2, the method includes the following steps.

Step S202: Receive first information and second information from the terminal, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation.

It should be noted that the first information and the second information in this embodiment of this application may be transmitted by using one piece of signaling, or may be transmitted separately by using two pieces of signaling. For example, the first information is transmitted by using signaling 1, and the second information is transmitted by using signaling 2. When the first information and the second information are transmitted separately by using two pieces of signaling, a sequence of transmitting the signaling 1 and the signaling 2 is not limited.

Step S204: Determine channel information of a downlink channel based on the first information, the second information, and the second parameter.

All or not all paths found in downlink channel estimation by the terminal may be the same as paths found in uplink channel estimation by the network-side device. Not all paths found in the downlink channel estimation by the terminal are the same as paths found in the uplink channel estimation by the network-side device. Therefore, the second information may include a plurality of deviations for a specific path. For example, a third parameter of paths 1, 2, 3, and 4 is obtained through downlink channel estimation by the terminal, and a second parameter of the paths 1, 3, and 4 is obtained through uplink channel estimation by the network-side device. In this case, the second information reported by the terminal may include two deviations for the path 1 or two deviations for the path 3.

It should be noted that the second information may be default when there is no deviation between a second parameter and a third parameter on any paths (a deviation is 0) or when a deviation is less than a threshold. Further, the deviation between the second parameter and the third parameter in this embodiment of this application may be a quantized deviation.

It can be learned that, in the foregoing steps S202 to S204, the terminal needs to feed back only channel information without uplink/downlink channel reciprocity and a deviation between channel parameters with uplink/downlink channel reciprocity to the network-side device, and the network-side device determines the channel information of the downlink channel based on this part of information, thereby greatly reducing feedback overheads of downlink channel estimation.

It should be noted that the first parameter in this application may be a gain of a target path without reciprocity. Certainly, this is only an example for description, and other channel parameters without reciprocity also fall within the protection scope of this application.

Optionally, in this embodiment of this application, the method of this application may further include the following steps.

Step S200: Before the first information is received from the terminal, perform channel estimation on an uplink channel and determine the second parameter from a channel estimation result.

Step S201: Transmit the second parameter to the terminal.

It can be learned from the foregoing steps S200 and S201 that, before the terminal feeds back channel information, a base station needs to perform uplink channel estimation, and transmit, to the terminal, a parameter that has uplink/downlink channel reciprocity obtained through channel estimation.

Optionally, in addition to the foregoing steps S200 to S204, the method in this embodiment of this application may further include the following step:

Step S206: Receive third information from the terminal, where the third information includes a fourth parameter corresponding to a first path, and the first path is different from a path corresponding to the second parameter.

Based on this, further, a manner of determining the channel information of the downlink channel in this embodiment of this application may be: determining the channel information of the downlink channel based on the first information, the second information, the third information, and the second parameter.

It can be learned that, in this embodiment of this application, the path that corresponds to the second parameter obtained by the network-side device by performing uplink channel estimation and the path that corresponds to the fourth parameter obtained by the terminal by performing downlink channel estimation may be different paths, that is, the path corresponding to the fourth parameter is not found during uplink channel estimation by the network-side device, or the network-side device determines, during uplink channel estimation, that the path corresponding to the fourth parameter is not a strong path. That is, for a same path, only a deviation between the second parameter and the third parameter of the same path needs to be fed back; and for different paths, the terminal needs to feed back specific parameter information of channel parameters to the network-side device.

Optionally, the second parameter in this embodiment of this application may include a delay of a target path and/or a spatial angle of the target path, and the third parameter in this embodiment of this application may also include a delay of a target path and/or a spatial angle of the target path.

It should be noted that the target path in this embodiment of this application is at least one of the following: a path indicated by the network-side device, a path with a deviation, and a path discovered by the terminal. The path indicated by the network-side device may be the path corresponding to the second parameter, or a discovered strong path (for example, a path having a strong signal discovered during an uplink channel estimation by the network-side device). The path with a deviation may be a path for which a deviation exists between uplink and downlink channel parameters or the deviation is greater than a threshold, for example, a path with a deviation between the second parameter and the third parameter being greater than a threshold in this embodiment of this application, where the threshold may be correspondingly set as required. The path discovered by the terminal may be a path corresponding to the third parameter; or may be a discovered strong path, that is, a path with a strong signal discovered by the terminal in a downlink channel estimation process; or may be a combination of the foregoing two paths.

In addition, the target path may be a path in a multi-path delay channel, or a path in a single-path delay channel. Further, regardless of the multi-path delay channel or the single-path delay channel, delays or spatial angles of all paths in the channel are the same. Therefore, the target path may be any path in the multi-path delay channel or the single-path delay channel. In addition, the delay of the target path and/or the spatial angle of the target path that are included in the second parameter and the third parameter are only preferred manners in this application, and other channel parameters with reciprocity are also applicable, that is, all channel parameters with reciprocity fall within the protection scope of this application.

Based on this, the second information in the embodiment of this application is used to indicate the deviation between the second parameter and the third parameter that have uplink/downlink channel reciprocity, and the deviation may be specifically a deviation between a delay in the second parameter and a delay in the third parameter; or a deviation between a spatial angle in the second parameter and a spatial angle in the third parameter; or a deviation between a delay in the second parameter and a delay in the third parameter, and a deviation between a spatial angle in the second parameter and a spatial angle in the third parameter.

It should be noted that, in a case that the second parameter and the third parameter both include a delay of a target path and a spatial angle of the target path, the second information is preferably used to indicate a deviation between a delay in the second parameter and a delay in the third parameter. That is, in this case, a deviation between a spatial angle in the second parameter and a spatial angle in the third parameter does not need to be indicated. However, if necessary, both the deviation between the delays and the deviation between the spatial angles may be alternatively indicated.

Therefore, the manner of performing channel estimation on the uplink channel and determining the second parameter from the channel estimation result in the foregoing step S200 may be further as follows.

Step S201-11: The network-side device may perform estimation on uplink channel information by using a channel sounding reference signal SRS to obtain a first uplink channel estimation result in frequency domain.

Step S201-12: The network-side device performs Fourier transform on the first uplink channel estimation result to obtain a second uplink channel estimation result in time domain.

Step S201-13: The network-side device determines a delay of a target path and/or a spatial angle of the target path from the second uplink channel estimation result.

It can be learned from the foregoing steps S201-11 to S201-13 that the first uplink channel estimation result in frequency domain needs to be obtained first; then Fourier transform is performed on the first uplink channel estimation result to obtain the second uplink channel estimation result in time domain; and finally the delay of the target path and/or the spatial angle of the target path are determined from the second uplink channel estimation result.

For the foregoing steps S201-11 to S201-13, in a specific application scenario of this embodiment of this application, for example, an OFDM-based massive MIMO system is used, the second parameter and the third parameter both include a delay of a target path and/or a spatial angle of the target path, and the first parameter is a gain of the target path.

In the OFDM-based massive MIMO system, there are N antennas at a transmit end (the network-side device), there is one antenna at a receive end (the terminal). That is, an N×1 massive antenna system is considered. The number of OFDM subcarriers in frequency domain is $N_C$. Every 12 subcarriers constitute one RB (Resource Block), and a plurality of RBs constitute one frequency sub-band. In an FDD broadband wireless communication system, there are both uplink and downlink, which respectively occupy different frequency bands. Herein, it is assumed that a center frequency of an uplink channel is $f_U$, and a center frequency of a downlink channel is $f_D$. An example in which the network-side device is a base station is used for description below.

In this embodiment of this application, the base station performs uplink channel estimation by using an SRS. The SRS is an uplink pilot signal transmitted by the terminal in frequency domain. On the uplink channel, a pilot is transmitted by a terminal equipped with only a few transmit antennas, and therefore pilot overheads are relatively small. The base station has N receive antennas for receiving the SRS, and each receive antenna may perform channel estimation independently. The $i^{th}$ antenna of the base station may obtain a channel estimation value $\hat{H}_i^{(UL)}$ within one OFDM symbol in frequency domain. Channel estimation values of all antennas in frequency domain constitute a matrix $\hat{H}_{UL}$. For the uplink channel, a channel estimation task has been completed.

However, to support downlink feedback, a part of information having partial uplink/downlink channel reciprocity obtained based on $\hat{H}_{UL}$ needs to be obtained. $\hat{H}_{UL}$ is a N×$N_C$ matrix, and is a channel estimation value in frequency domain. $\hat{H}_{UL}$ and $\hat{h}_{UL}$ being channel estimation values of all antennas in delay domain are a pair of DFT (Discrete Fourier Transform) transforms. Based on a spatial channel model, a multi-antenna delay-domain channel may be expressed as follows:

$$h_{UL} = \sum_{l=1}^{L} g_l^{ul} \alpha_u(\theta_l) \delta(\tau_l),$$

where $g_l^{ul}$ is a gain of the $l^{th}$ delay path, and $\tau_l$ is a delay of the $l^{th}$ delay path. $\alpha_u(\theta_l)$ is a spatial steering vector of N uplink receive antennas, and may be expressed as follows:

$$\alpha_u(\theta_l) = \left[1 \ e^{j2\pi \frac{d}{\lambda_{UL}} \sin\theta_l} \ ... \ e^{j2\pi(N-1)\frac{d}{\lambda_{UL}} \sin\theta_l}\right],$$

where $\theta_l$ is a spatial angle of the $l^{th}$ delay path, $\lambda_{UL} = c/f_U$ is a wavelength of a carrier at the center frequency of the uplink channel, and d is a distance between antennas.

Further, an uplink channel $H_{UL}$ in frequency domain may be expressed by using the following formula:

$$H_{UL} = \sum_{l=1}^{L} g_l^{ul} \alpha_u(\theta_l) \otimes F(\tau_l),$$

where $\otimes$ is a Kronecker product of the matrix, and $F(\tau_l)$ may be expressed as follows:

$$F(\tau) = [1 \ e^{j2\pi\Delta f\tau} \ ... \ j2\pi(N-1)\Delta f\tau]$$

Based on the expression of $H_{UL}$, all values of $\tau_l$, $\theta_l$, and $g_l^{ul}$ may be obtained through DFT by using the channel $\hat{H}_{UL}$, of all antennas in frequency domain, that is obtained through estimation based on the SRS. A delay $\tau_l$ and a spatial angle $\theta_l$ in the downlink channel are reciprocal with the delay $\tau_l$ and the spatial angle $\theta_l$ in the uplink channel. Only gains of delay paths are identically distributed and independent of each other, that is, $\tau_l$ and $\theta_l$ are parameters shared by the uplink channel and the downlink channel.

Optionally, before the gain of the target path and the first information that are fed back by the terminal are received, the method in this embodiment of this application may further include: transmitting, by the network-side device, a channel state information reference signal CSI-RS to the terminal through broadcasting. The CSI-RS is used to indicate the terminal to perform channel estimation on the downlink channel.

Optionally, in this embodiment of this application, the manner of determining the channel information of the downlink channel based on the first information, the second information, and the second parameter in step S204 in a specific application scenario of this embodiment of this application may be as follows.

After the base station obtains $\theta_l$ and $\tau_l$ (l=1, 2, ..., L) through uplink channel estimation, the base station can restore the downlink channel by using $g_l^{dl}$ (l=1, 2, ..., L) and $\Delta\tau$ that are fed back by the terminal, thereby greatly reducing a feedback amount, where a downlink channel in frequency domain may be determined by using the following formula:

$$H_{DL} = \sum_{l=1}^{L} g_l^{dl} \alpha_d(\theta_l) \otimes F(\tau_l + \Delta\tau)$$

To make the obtained gain of the target path more accurate, step S204 may be further as follows.

Step S204-11: The network-side device inputs the first information to a target neural network to obtain fourth information, where the target neural network is obtained by training an initial neural network through a preset training set, and the preset training set includes first information obtained at a plurality of historical moments.

Step S204-12: The network-side device determines the channel information of the downlink channel by using the fourth information, the second information, and the second parameter.

It can be learned that, in this embodiment of this application, to make the obtained gain of the target path more accurate, the network-side device inputs the obtained gain of the target path to the trained target neural network, and then obtains a gain output by the target neural network.

It should be noted that, in a specific application scenario, $g_l^{ul}$ and $g_l^{dl}$ also change with time, and change faster with a higher movement speed. Therefore, $g_l^{dl}$ fed back at different times is correlated. Therefore, the base station can obtain the downlink channel more accurately based on the correlation.

First, $g_l^{ul}$ and $g_l^{dl}$ are modeled into random variables in a Rayleigh distribution. In addition, $g_l^{ul}$ and $g_l^{dl}$ also change with time, and change faster with a higher movement speed. To track a change of $g_l^{dl}$, a neural network is used in this embodiment of this application, and a previous feedback value is used to restore a current value to the greatest extent.

Values of $g_l^{dl}$ are independent of each other, and therefore can be fed back and restored independently. One value of $g_l^{dl}$ is used as an example. If a current moment is t and there is no feedback at the current moment, the value of $g_l^{dl}(t)$ may be obtained based on a previous feedback value $g_l^{dl}(t-1)$, $g_l^{dl}(t-2), \ldots, g_l^{dl}(t-K)$. To obtain an accurate value of $g_l^{dl}$ of a current channel by the base station, feedback values of $g_l^{dl}(t-1), g_l^{dl}(t-2), \ldots, g_l^{dl}(t-K)$ at previous K moments received by the base station are input to a neural network. Herein, a fully connected 3-layer neural network is used. An RELU function is selected as an activation function. Output of the neural network is an estimation value $\hat{g}_l^{dl}(t)$ of $g_l^{dl}(t)$ at the current moment.

It should be noted that, to improve performance of channel estimation, the neural network needs to be trained. Training data comes from the feedback values $g_l^{dl}(t-1)$, $g_l^{dl}(t-2), \ldots g_l^{dl}(t-K)$ of the previous K moments, and a training objective (cost function) for optimization is to obtain a minimum mean square error between the output $\hat{g}_l^{dl}(t)$ of the neural network and $g_l^{dl}(t)$ of an actual channel. That is, $$\min(|g_l^{dl}(t) - \hat{g}_l^{dl}(t)|^2)$$

after the training is completed, a trained neural network is used to improve channel obtaining. The base station inputs a received feedback value to the trained neural network, and output of the neural network is the estimation value $\hat{g}_l^{dl}(t)$ of $g_l^{dl}(t)$ at the current moment.

Finally, based on $\hat{g}_l^{dl}(t)$ output by the neural network, $\Delta\tau$ fed back by the terminal, and $\theta_l$ and $\tau_l$ (l=1, 2, ..., L) obtained through uplink channel estimation, the downlink channel is obtained at high accuracy as follows:

$$H_{DL} = \sum_{l=1}^{L} \hat{g}_l^{dl}(t) \alpha_d(\theta_l) \otimes F(\tau_l + \Delta\tau)$$

The following describes the channel information processing method in the embodiments of this application from the perspective of the terminal.

Figure 3:
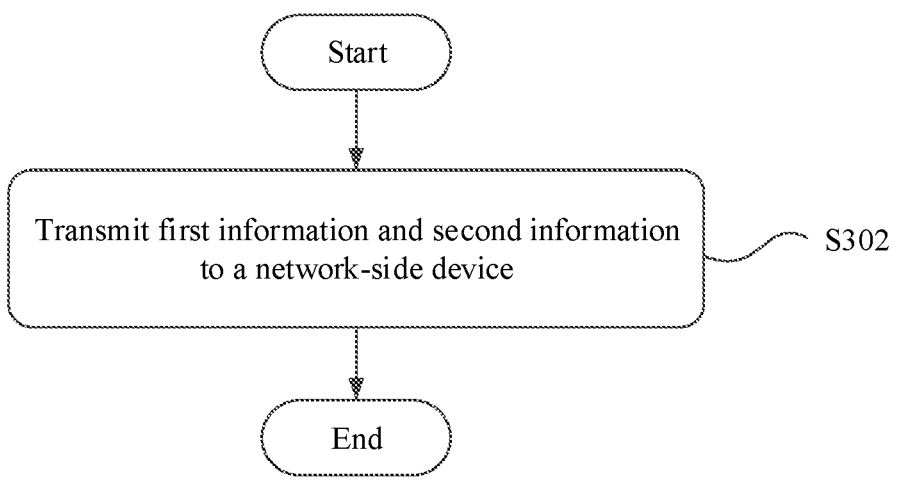
FIG. 3 is a flowchart 2 of a channel information processing method according to an embodiment of this application.

FIG. 3 is a flowchart 2 of a channel information processing method according to an embodiment of this application. As shown in FIG. 3, the method includes the following step.

Step S302: Transmit first information and second information to the network-side device, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation.

It can be learned that, in the foregoing step S302, the terminal needs to feed back only a channel parameter without reciprocity to the network-side device, and does not need to feed back another parameter with reciprocity, thereby reducing feedback overheads.

Further, in the foregoing step S302, there may also be a deviation between parameters with uplink/downlink channel reciprocity. To enable the network-side device to obtain channel information of a downlink channel more accurately, the network-side device needs to transmit a parameter with reciprocity to the terminal, the terminal determines a corresponding parameter with reciprocity in downlink channel estimation, and the terminal further transmits a deviation between the parameters with reciprocity to the network-side device. Therefore, based on the foregoing step S302, steps of the method in this embodiment of this application may be further as follows:

Optionally, in this embodiment of this application, before the transmitting first information to the network-side device, the method in this embodiment of this application may further include the following step.

Step S301: Perform channel estimation on a downlink channel, and determine the first parameter and the third parameter from a channel estimation result.

Based on the foregoing step S301, the method in this embodiment of this application may further include the following steps.

Step S304: Receive the second parameter transmitted by the network-side device, where the second parameter is determined based on uplink channel estimation and has uplink/downlink channel reciprocity.

Step S306: Transmit the second information to the network-side device, where the second information is used to indicate the deviation between the second parameter and the third parameter that have uplink/downlink channel reciprocity.

It can be learned that the terminal feeds back not only a channel parameter without reciprocity to the network-side device, but also a deviation between parameters with reciprocity, so that the network-side device can obtain channel information of the downlink channel more accurately.

Optionally, the method in this embodiment of this application may further include the following step: transmitting third information to the network-side device, where the third information includes a fourth parameter corresponding to a first path, and the first path is different from a path corresponding to the second parameter.

It can be learned that, in this embodiment of this application, the path that corresponds to the second parameter obtained by the network-side device by performing uplink channel estimation and the path that corresponds to the fourth parameter which obtained by the terminal by performing downlink channel estimation are different paths, that is, the network-side device does not perform uplink channel estimation on a path corresponding to the fourth parameter. That is, for a same path, only a deviation between the second parameter and the third parameter of the same path needs to be fed back; for different paths, the terminal needs to feed back channel parameters to the network-side device.

Optionally, the second parameter in this embodiment of this application may include a delay of a target path and/or a spatial angle of the target path, and the second parameter in this embodiment of this application may also include a delay of a target path and/or a spatial angle of the target path.

It should be noted that the target path may be a path in a multi-path delay channel, or a path in a single-path delay channel. Further, regardless of the multi-path delay channel or the single-path delay channel, delays or spatial angles of all paths in the channel are the same. Therefore, the target path may be any path in the multi-path delay channel or the single-path delay channel. In addition, the delay of the target path and/or the spatial angle of the target path that are included in the second parameter and the third parameter are only preferred manners in this application, and other channel parameters with reciprocity are also applicable, that is, all channel parameters with reciprocity fall within the protection scope of this application.

Based on this, the second information in the embodiment of this application is used to indicate the deviation between the second parameter and the third parameter that have uplink/downlink channel reciprocity, and the deviation may be specifically a deviation between a delay in the second parameter and a delay in the third parameter; or a deviation between a spatial angle in the second parameter and a spatial angle in the third parameter; or a deviation between a delay in the second parameter and a delay in the third parameter, and a deviation between a spatial angle in the second parameter and a spatial angle in the third parameter.

It should be noted that, in a case that the second parameter and the third parameter both include a delay of a target path and a spatial angle of the target path, the second information is preferably used to indicate a deviation between a delay in the second parameter and a delay in the third parameter. That is, in this case, a deviation between a spatial angle in the second parameter and a spatial angle in the third parameter does not need to be indicated. However, if necessary, both the deviation between the delays and the deviation between the spatial angles may be alternatively indicated.

Optionally, in this embodiment of this application, the manner of performing channel estimation on the downlink channel and determining the first parameter and the third parameter from the channel estimation result in the foregoing step S301 may be further as follows.

Step S301-11: The terminal performs channel estimation on the downlink channel to obtain a first downlink channel estimation result in frequency domain.

A manner of performing, by the terminal, channel estimation on the downlink channel may be specifically as follows: The terminal receives a CSI-RS transmitted by the network-side device, and the terminal performs channel estimation on the downlink channel based on the CSI-RS.

Step S301-12: The terminal performs two-dimensional Fourier transform on the first downlink channel estimation result to obtain a second downlink channel estimation result in time domain.

Step S301-13: The terminal determines a delay of a target path and/or a spatial angle of the target path from the second downlink channel estimation result.

In a specific application scenario, for example, the second parameter and the third parameter both include a delay of a target path and/or a spatial angle of the target path, and the first parameter is a gain of the target path. The foregoing step S301-11 to step S301-13 may be as follows: A base station configures values of $\theta_l$ and $\tau_l$ to the terminal by using downlink signaling, for example, Radio Resource Control (RRC) signaling, Media Access Control Control Element (MAC-CE) signaling, or Downlink Control Information (DCI), where $\theta_l$ and $\tau_l$ are obtained through uplink channel estimation. In addition, the base station further transmits a CSI-RS to enable the terminal to perform downlink channel estimation, and the terminal estimates a downlink channel $\hat{H}_{DL}$ by using the CSI-RS. Similar to that of the uplink channel $\hat{H}_{UL}$, an expression of a downlink channel $H_{DL}$ in frequency domain may be obtained as follows:

$$H_{DL} = \sum_{l=1}^{L} g_l^{dl} \alpha_d(\theta_l) \otimes F(\tau_l),$$

where $\alpha_d(\theta_l)$ is a spatial steering vector of N uplink receive antennas, and may be expressed as follows:

$$\alpha_d(\theta_l) = \left[1 \quad e^{j2\pi\frac{d}{\lambda_{DL}}\sin\theta_l} \quad \ldots \quad e^{j2\pi(N-1)\frac{d}{\lambda_{DL}}\sin\theta_l}\right],$$

where $\lambda_{DL}=c/f_D$ is a wavelength of a carrier at a center frequency of the downlink channel.

Based on downlink channel estimation $\hat{H}_{DL}$ of all antennas in frequency domain, corresponding values of a delay spread $\tau'_l$, a spatial angle $\theta'_l$, and $g_l^{dl}$ of the downlink channel may be obtained through DFT. $\tau'_l$ and $\theta'_l$ should be reciprocal with $\tau_l$ and $\theta_l$ that are configured by the base station by using the downlink signaling, that is, there is a specific deviation in uplink/downlink channel synchronization. Therefore, there is a specific deviation between $\tau'_l$ and $\tau_l$ configured for the uplink channel. A value of the deviation may be obtained by comparing $\theta'_l$ and $\theta_l$. For delay deviations of different paths, the terminal may separately report the delay deviations of the paths. L target paths are used as an example. The terminal separately reports a delay deviation $(\tau'_l-\tau_l)$ of the $1^{st}$ path in the L target paths to the network-side device. Alternatively, for delay deviations of different paths, the terminal may report one delay deviation. In this case, for all $\tau_l$ (l=1, 2, ..., L), the deviation is defined the same.

$$\Delta\tau = 1/L\sum_{l=1}^{L}(\tau'_l - \tau_l)$$

Finally, the terminal feeds back $g_l^{dl}$ (l=1, 2, ..., L) and $\Delta\tau$ to the base station. It can be learned that channel feedback does not need to be separately performed on each frequency sub-band, but all required information is fed back at a time, and channel information on all subcarriers may be calculated based on the information, thereby greatly reducing feedback overheads.

It should be noted that the channel information processing method provided in the embodiments of this application may be performed by a channel information processing apparatus, or by a control module that is in the channel information processing apparatus and that is configured to perform the channel information processing method. In the embodiments of this application, the channel information processing method provided in the embodiments of this application is described by using an example in which a channel information processing apparatus performs the channel information processing method.

Figure 4:
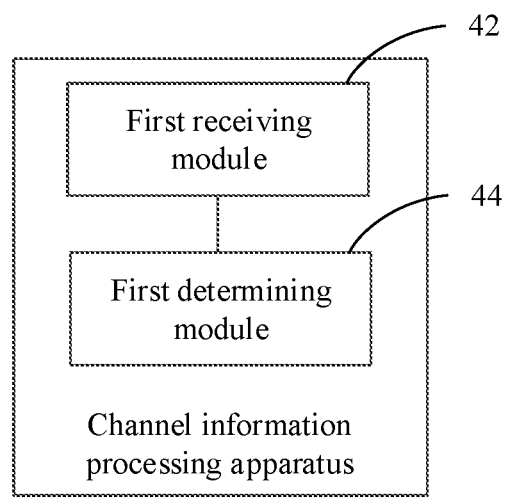
FIG. 4 is a schematic structural diagram 1 of a channel information processing apparatus according to an embodiment of this application.

FIG. 4 is a schematic structural diagram 1 of a channel information processing apparatus according to an embodiment of this application. The apparatus is applied to a network-side device, and the apparatus includes:

a first receiving module 42, configured to receive first information and second information from a terminal, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation; and a first determining module 44, configured to determine channel information of a downlink channel based on the first information, the second information, and the second parameter.

Optionally, the apparatus in this embodiment of this application may further include: a first processing module, configured to: before the first information and the second information are received from the terminal, perform channel estimation on an uplink channel and determine the second parameter from a channel estimation result; and a first transmitting module, configured to transmit the second parameter to the terminal.

Optionally, the apparatus in this embodiment of this application may further include: a second receiving module, configured to receive third information from the terminal, where the third information includes a fourth parameter corresponding to a first path, and the first path is different from a path corresponding to the second parameter.

Optionally, the first determining module in this embodiment of this application is further configured to determine the channel information of the downlink channel based on the first information, the second information, the third information, and the second parameter.

Optionally, the second parameter and the third parameter in this embodiment of this application both include a delay of a target path and/or a spatial angle of the target path.

The target path is at least one of the following: a path indicated by the network-side device, a path with a deviation, and a path discovered by the terminal.

In addition, in a case that the second parameter and the third parameter both include a delay of a target path and a spatial angle of the target path, the second information is used to indicate a deviation between a delay in the second parameter and a delay in the third parameter.

Optionally, the first processing module in this embodiment of this application may further include: a first processing unit, configured to perform estimation on uplink channel information to obtain a first uplink channel estimation result in frequency domain; a second processing unit, configured to perform Fourier transform on the first uplink channel estimation result to obtain a second uplink channel estimation result in time domain; and a third processing unit, configured to determine a delay of a target path and/or a spatial angle of the target path from the second uplink channel estimation result.

Optionally, the first determining module in this embodiment of this application may further include: a first input unit, configured to input the first information to a target neural network to obtain fourth information; and a first determining unit, configured to determine the channel information of the downlink channel by using the fourth information, the second information, and the second parameter.

Optionally, the target neural network in this embodiment of this application is obtained by training an initial neural network through a preset training set, and the preset training set includes first information obtained at a plurality of historical moments.

Optionally, the first parameter included in the first information in this embodiment of this application is a gain of a target path.

With the apparatus in FIG. 4 in this embodiment of this application, after uplink channel estimation is performed, the second parameter may be determined by using a channel estimation result of the uplink channel estimation, and the channel information of the downlink channel can be obtained after the terminal feeds back, to the network-side device, a deviation between channel parameters with uplink/downlink channel reciprocity and a channel parameter without uplink/downlink reciprocity, without feeding back other channel parameters, thereby reducing channel feedback overheads.

Figure 5:
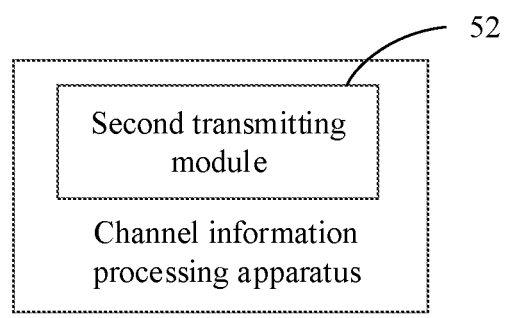
FIG. 5 is a schematic structural diagram 2 of a channel information processing apparatus according to an embodiment of this application.

FIG. 5 is a schematic structural diagram 2 of a channel information processing apparatus according to an embodiment of this application. The apparatus is applied to a terminal. As shown in FIG. 5, and the apparatus includes:

a second transmitting module 52, configured to transmit first information and second information to a network-side device, where the first information includes a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation.

Optionally, the apparatus in this embodiment of this application may further include a second processing module, configured to: before the first information and the second information are transmitted to the network-side device, perform channel estimation on a downlink channel, and determine the first parameter and the third parameter from a channel estimation result.

Optionally, the apparatus in this embodiment of this application may further include a third receiving module, configured to receive the second parameter transmitted by the network-side device.

Optionally, the apparatus in this embodiment of this application may further include a third transmitting module, configured to transmit third information to the network-side device, where the third information includes a fourth parameter corresponding to a first path, and the first path is different from a path corresponding to the second parameter.

Optionally, the second parameter and the third parameter in this embodiment of this application both include a delay of a target path and/or a spatial angle of the target path.

In a case that the second parameter and the third parameter both include a delay of a target path and a spatial angle of the target path, the second information is used to indicate a deviation between a delay in the second parameter and a delay in the third parameter.

Optionally, the second processing module in this embodiment of this application may further include: a fourth processing unit, configured to perform channel estimation on the downlink channel to obtain a first downlink channel estimation result in frequency domain; a fifth processing unit, configured to perform two-dimensional Fourier transform on the first downlink channel estimation result to obtain a second downlink channel estimation result in time domain; and a sixth processing unit, configured to determine a delay of a target path and/or a spatial angle of the target path from the second downlink channel estimation result.

With the apparatus in FIG. 5 in this embodiment of this application, after channel estimation is performed, only a deviation between channel parameters with uplink/downlink channel reciprocity and a channel parameter without uplink/downlink reciprocity need to be fed back to the network-side device, without feeding back other channel parameters, thereby reducing feedback overheads.

It should be noted that the channel information processing apparatus in FIG. 5 in this embodiment of this application may be an apparatus, or may be a component, an integrated circuit, or a chip in a terminal. The apparatus may be a mobile terminal or a non-mobile terminal. For example, the mobile terminal may include but is not limited to the aforementioned types of the terminal 11, and the non-mobile terminal may be a server, a network attached storage (NAS), a personal computer (PC), a television (TV), a teller machine, a self-service machine, or the like. This is not specifically limited in this embodiment of this application.

The channel information processing apparatus in this embodiment of this application may be an apparatus having an operating system. The operating system may be the Android operating system, the iOS operating system, or other possible operating systems, which is not specifically limited in the embodiments of this application.

The channel information processing apparatus provided in this embodiment of this application is capable of implementing the processes implemented in the method embodiment of FIG. 3, with the same technical effects achieved. To avoid repetition, details are not described herein again.

Figure 6:
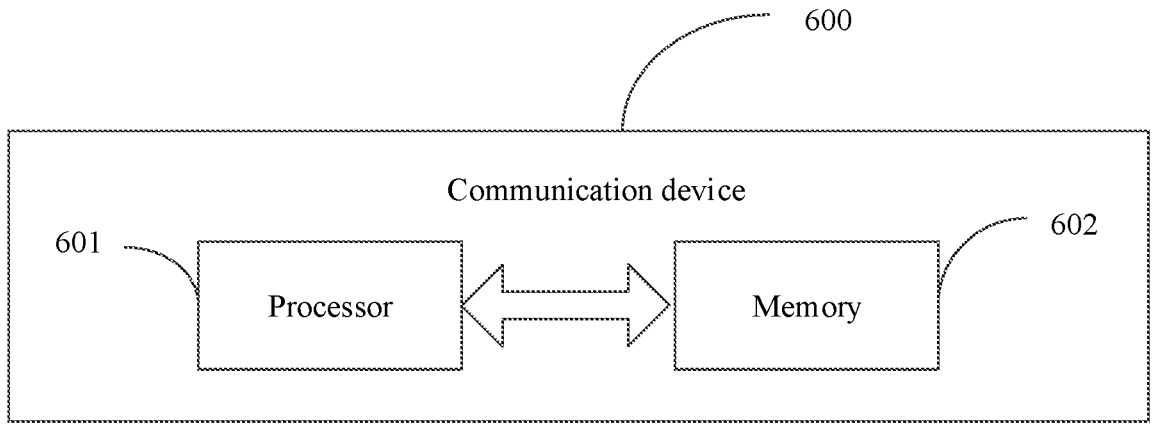
FIG. 6 is a schematic structural diagram of a communication device for implementing an embodiment of this application.

Optionally, as shown in FIG. 6, an embodiment of this application further provides a communication device 600, including a processor 601, a memory 602, and a program or instructions stored in the memory 602 and capable of running on the processor 601. For example, when the communication device 600 is a terminal, and when the program or instructions are executed by the processor 601, the processes of the embodiment of the channel information processing method in FIG. 3 are implemented, with the same technical effects achieved. When the communication device 600 is a network-side device, and when the program or instructions are executed by the processor 601, the processes of the embodiment of the channel information processing method in FIG. 2 are implemented, with the same technical effects achieved. To avoid repetition, details are not described herein again.

Figure 7:
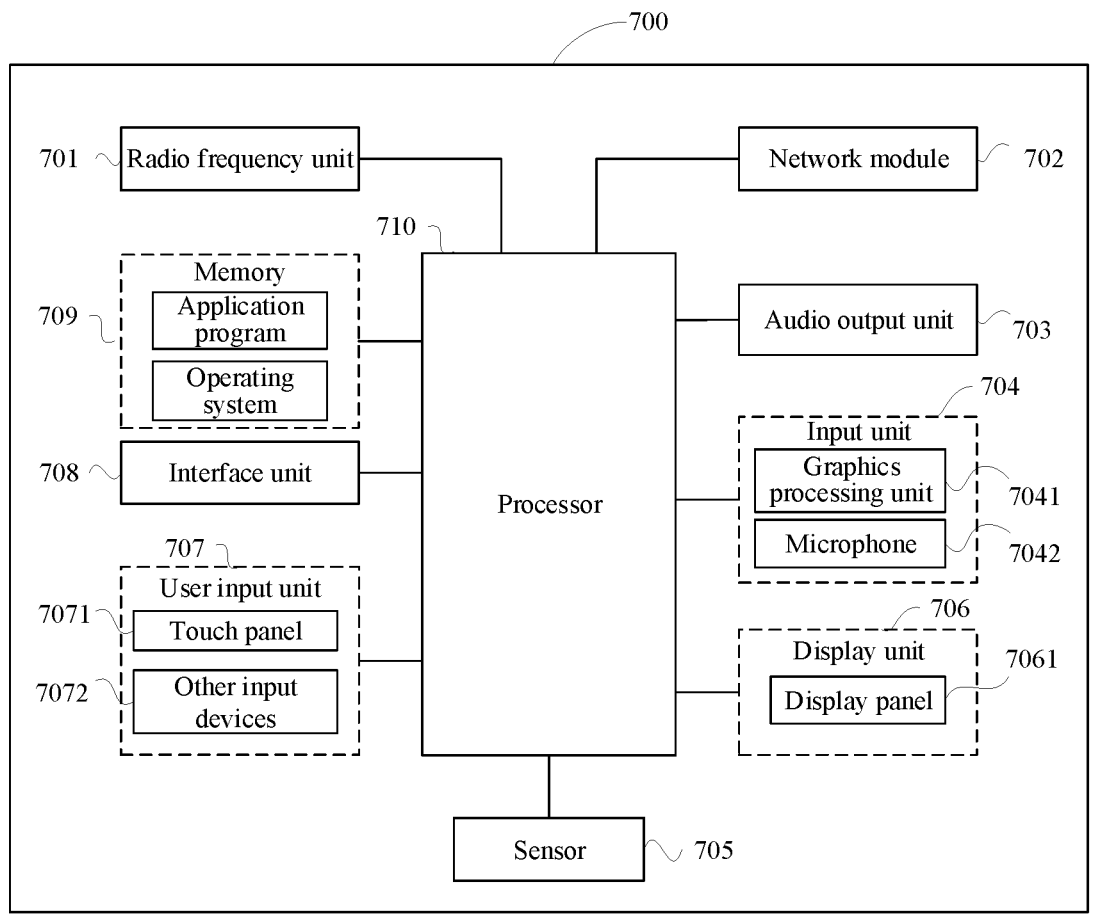
FIG. 7 is a schematic diagram of a hardware structure of a terminal for implementing an embodiment of this application.

FIG. 7 is a schematic diagram of a hardware structure of a terminal for implementing an embodiment of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (for example, a battery) supplying power to all components, and the power supply may be logically connected to the processor 710 through a power management system. In this way, functions such as charge management, discharge management, and power consumption management are implemented by using the power management system. The structure of the terminal shown in FIG. 7 does not constitute any limitation on the terminal. The terminal may include more or fewer components than those shown in the figure, or a combination of some components, or the components disposed differently. Details are not repeated herein.

It should be understood that in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 may include a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a power on/off key), a trackball, a mouse, a joystick, and the like. Details are not described herein.

In this embodiment of this application, the radio frequency unit 701 receives downlink data from a network-side device and then transmits the downlink data to the processor 710 for processing; and transmits uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may mainly include a program/instruction storage area and a data storage area. The program/instruction storage area may store an operating system, an application program or instruction required by at least one function (for example, a sound playback function or an image playback function), and the like. In addition, the memory 709 may include a high-speed random access memory, or may include a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or a flash memory, for example, at least one disk storage device, a flash memory device, or other non-volatile solid state storage devices.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, such as a baseband processor. It can be understood that the modem processor may alternatively be not integrated in the processor 710.

The radio frequency unit 701 is configured to receive a first parameter transmitted by the network-side device, where the first parameter is determined by the network-side device from a channel estimation result after the network-side device performs channel estimation on an uplink channel.

The processor 710 is configured to perform channel estimation on a downlink channel, and determine a second parameter and a first gain of each path in a multi-path delay channel from a channel estimation result.

The radio frequency unit 701 is further configured to transmit a deviation parameter and the first gain of each path in the multi-path delay channel to the network-side device, where the deviation parameter is used to indicate a deviation between the first parameter and the second parameter.

Optionally, the processor 710 is further configured to perform estimation on uplink channel information by using a channel sounding reference signal SRS to obtain a first uplink channel estimation result in frequency domain; and perform Fourier transform on the first uplink channel estimation result to obtain a second uplink channel estimation result in time domain; and determine a delay of each path in the multi-path delay channel and/or a spatial angle of each path from the second uplink channel estimation result.

Figure 8:
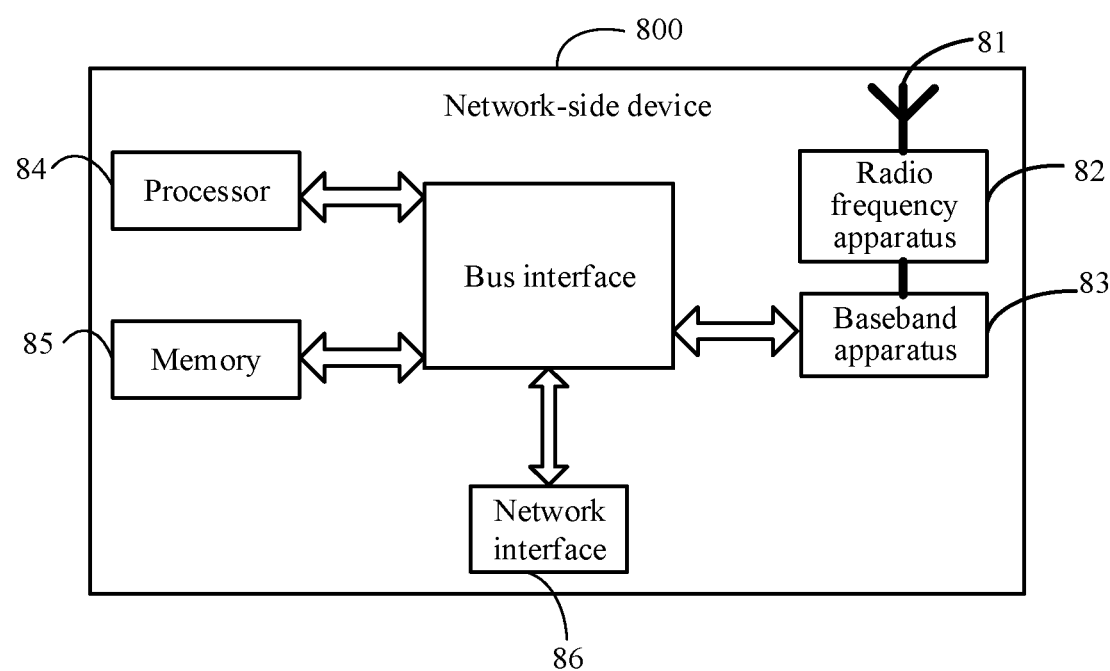
FIG. 8 is a schematic structural diagram of a network-side device for implementing an embodiment of this application.

Specifically, an embodiment of this application further provides a network-side device. As shown in FIG. 8, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The frequency band processing apparatus may be located in the baseband apparatus 83. The method performed by the network-side device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, connected to the memory 85, to invoke a program in the memory 85 to perform the operation of the network-side device shown in the foregoing method embodiment.

The baseband apparatus 83 may further include a network interface 86, configured to exchange information with the radio frequency apparatus 82, where the interface is, for example, a common public radio interface (CPRI).

Specifically, the network-side device in this embodiment of this invention further includes instructions or a program stored in the memory 85 and capable of running on the processor 84, and the processor 84 invokes the instructions or program in the memory 85 to perform the method performed by the modules shown in FIG. 4, with the same technical effects achieved. To avoid repetition, details are not described herein again.

An embodiment of this application further provides a readable storage medium, where a program or an instruction is stored in the readable storage medium. When the program or instruction is executed by a processor, the processes of the foregoing embodiments of the channel information processing method in FIG. 2 and FIG. 3 can be implemented, with the same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or an instruction to implement the processes of the foregoing embodiments of the channel information processing method, with the same technical effects achieved. To avoid repetition, details are not repeated herein.

It should be understood that the chip mentioned in this embodiment of this application may also be referred to as a system-on-chip, a system chip, a system-on-a-chip, or a system on a chip, or the like.

It may be understood that the embodiments described in this disclosure may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. Furthermore, it should be noted that, in the scope of the method and apparatus in the embodiments of this application, execution of the functions are not limited to the order shown or described, and the functions may alternatively be executed in a substantially simultaneous manner or in a reverse order. For example, the described method may be performed in an order different from that described, and steps may be added, omitted, or combined. In addition, features described with reference to some examples may be combined in other examples.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A channel information processing method, applied to a network-side device, and comprising:
    receiving first information and second information from a terminal, wherein the first information comprises a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation; and
    determining channel information of a downlink channel based on the first information, the second information, and the second parameter.

2. The method according to claim 1, wherein before the receiving first information and second information from a terminal, the method further comprises:
    performing channel estimation on an uplink channel and determining the second parameter from a channel estimation result; and
    transmitting the second parameter to the terminal.

3. The method according to claim 1, wherein the method further comprises:
    receiving third information from the terminal, wherein the third information comprises a fourth parameter corresponding to a first path, and the first path is different from a path corresponding to the second parameter;
    wherein the determining channel information of a downlink channel comprises:
    determining the channel information of the downlink channel based on the first information, the second information, the third information, and the second parameter.

4. The method according to claim 1, wherein the second parameter and the third parameter each comprise a delay of a target path and/or a spatial angle of the target path;
    wherein the target path comprises at least one of the following: a path indicated by the network-side device, a path for which the deviation between the second parameter and the third parameter is greater than a threshold, and a path discovered by the terminal.

5. The method according to claim 4, wherein in a case that the second parameter and the third parameter each comprise a delay of a target path and a spatial angle of the target path, the second information is used to indicate a deviation between a delay in the second parameter and a delay in the third parameter.

6. The method according to claim 2, wherein the performing channel estimation on an uplink channel and determining the second parameter from a channel estimation result comprises:
    performing estimation on uplink channel information to obtain a first uplink channel estimation result in frequency domain;
    performing Fourier transform on the first uplink channel estimation result to obtain a second uplink channel estimation result in time domain; and
    determining a delay of a target path and/or a spatial angle of the target path from the second uplink channel estimation result.

7. The method according to claim 1, wherein the determining channel information of a downlink channel based on the first information, the second information, and the second parameter comprises:
    inputting the first information to a target neural network to obtain fourth information; and
    determining the channel information of the downlink channel by using the fourth information, the second information, and the second parameter.

8. The method according to claim 7, wherein the target neural network is obtained by training an initial neural network through a preset training set, and the preset training set comprises first information obtained at a plurality of historical moments.

9. The method according to claim 1, wherein the first parameter in the first information is a gain of a target path.

10. A channel information processing method, applied to a terminal, and comprising:
    transmitting first information and second information to a network-side device, wherein the first information comprises a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation.

11. The method according to claim 10, wherein before the transmitting first information and second information to a network-side device, the method comprises:
performing channel estimation on a downlink channel, and determining the first parameter and the third parameter from a channel estimation result.

12. The method according to claim 10, wherein before the transmitting first information and second information to a network-side device, the method further comprises:
receiving the second parameter transmitted by the network-side device.

13. The method according to claim 10, wherein the method comprises:
transmitting third information to the network-side device, wherein the third information comprises a fourth parameter corresponding to a first path, and the first path is different from a path corresponding to the second parameter.

14. The method according to claim 12, wherein the second parameter and the third parameter each comprise a delay of a target path and/or a spatial angle of the target path.

15. The method according to claim 14, wherein in a case that the second parameter and the third parameter each comprise a delay of a target path and a spatial angle of the target path, the second information is used to indicate a deviation between a delay in the second parameter and a delay in the third parameter.

16. The method according to claim 11, wherein the performing channel estimation on a downlink channel, and determining the first parameter from a channel estimation result comprises:
performing channel estimation on the downlink channel to obtain a first downlink channel estimation result in frequency domain;
performing two-dimensional Fourier transform on the first downlink channel estimation result to obtain a second downlink channel estimation result in time domain; and
determining a delay of a target path and/or a spatial angle of the target path from the second downlink channel estimation result.

17. A terminal, comprising a processor, a memory, and a program or instructions stored in the memory and capable of running on the processor, wherein when the program or instructions are executed by the processor, the following steps are implemented:
transmitting first information and second information to a network-side device, wherein the first information comprises a first parameter without uplink/downlink channel reciprocity, the first parameter is determined based on downlink channel estimation, the second information is used to indicate a deviation between a second parameter and a third parameter that have uplink/downlink channel reciprocity, the second parameter is determined based on uplink channel estimation, and the third parameter is determined based on downlink channel estimation.

18. The terminal according to claim 17, wherein before the transmitting first information and second information to a network-side device, when the program or instructions are executed by the processor, the following steps are further implemented:
performing channel estimation on a downlink channel, and determining the first parameter and the third parameter from a channel estimation result.

19. The terminal according to claim 17, wherein before the transmitting first information and second information to a network-side device, when the program or instructions are executed by the processor, the following steps are further implemented:
receiving the second parameter transmitted by the network-side device.

20. A network-side device, comprising a processor, a memory, and a program or instructions stored in the memory and capable of running on the processor, wherein when the program or instructions are executed by the processor, the steps of the channel information processing method according claim 1 are implemented.

* * * * *